United States Patent [19]

Negri

[11] Patent Number: 5,076,020

[45] Date of Patent: Dec. 31, 1991

[54] APPARATUS FOR IN-SITU DRESSING OF THREADED GRINDING WHEELS USED IN GEAR GRINDING MACHINES

[75] Inventor: Roberto Negri, San Lazzaro di Savena, Italy

[73] Assignee: C.I.Ma.A Costruzioni Italiane Macchine Attrezzi S.p.A., Villanova di Castenaso, Italy

[21] Appl. No.: 489,776

[22] Filed: Mar. 5, 1990

Related U.S. Application Data

[63] Continuation of Ser. No. 237,853, Aug. 29, 1988, abandoned.

[30] Foreign Application Priority Data

Sep. 11, 1987 [IT] Italy ................................. 3606 A/87

[51] Int. Cl.⁵ ........................................... B24B 53/075
[52] U.S. Cl. .................................. 51/5 D; 51/165.87;
51/325; 125/11.02; 125/11.13
[58] Field of Search ............ 51/5 D, 287, 325, 165.71,
51/165.76, 165.77, 134.5 R, 165.8, 165.87;
125/11 R, 11 H, 11.01, 11.02, 11.04, 11.18,
11.06, 11.2, 11.13, 11.15; 364/474

[56] References Cited

U.S. PATENT DOCUMENTS

| | | | |
|---|---|---|---|
| 2,981,038 | 4/1961 | Flanders | 125/11.04 |
| 3,890,116 | 6/1975 | Robillard | 51/165.77 |
| 4,195,446 | 4/1980 | Angst | 51/165.71 |
| 4,219,972 | 9/1980 | Ota et al. | 125/11 R |
| 4,631,870 | 12/1986 | Sun | 51/165.87 |
| 4,813,188 | 3/1989 | Becker et al. | 51/165.71 |

FOREIGN PATENT DOCUMENTS 0242969 12/1985 Japan ................................. 51/5 D

*Primary Examiner*—Robert A. Rose
*Attorney, Agent, or Firm*—Dvorak and Traub

[57] ABSTRACT

An apparatus for in-situ dressing of threaded type grinding wheels that is more versatile in operation than conventional operator-controlled equipment. The grinding wheel and dressing tool posts are driven by respective motors controlled and synchronized exactly via a fully electronic control circuit, and the grinding wheel motor associates directly with the axis of the grinding wheel in conjunction with two separate encoders, designed to generate dissimilar pulse frequencies; the two encoders can be switched in and out to suit the respective requirements of grinding and dressing operations, so that the output pulse frequency does not rise beyond a level which can effectively be monitored by the control circuit.

5 Claims, 1 Drawing Sheet

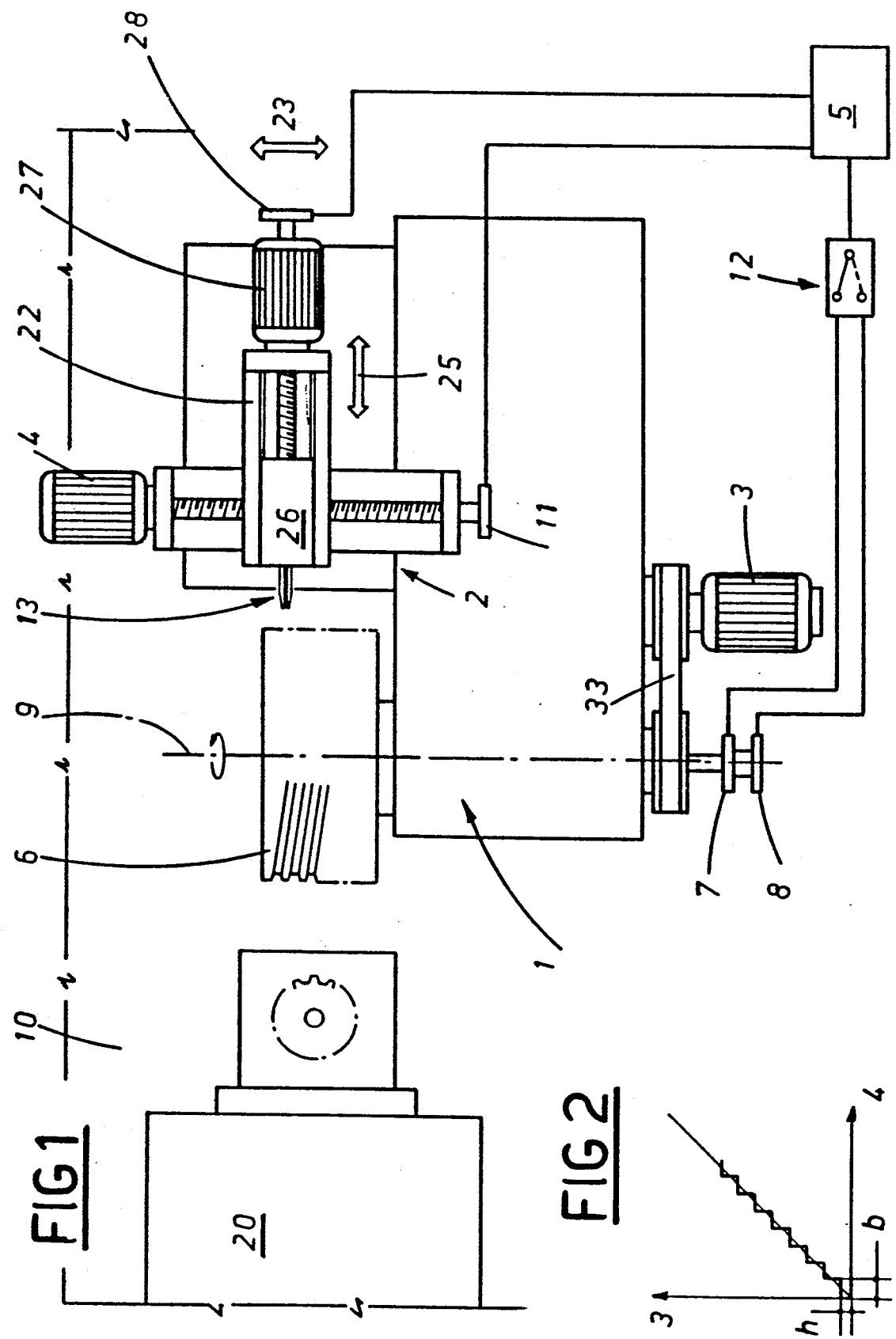

APPARATUS FOR IN-SITU DRESSING OF THREADED GRINDING WHEELS USED IN GEAR GRINDING MACHINES

This application is a continuation of application Ser. No. 237,853, filed Aug. 29, 1988, now abandoned.

BACKGROUND OF THE INVENTION

The invention relates to apparatus for in-situ dressing of threaded type grinding wheels used in gear grinding machines.

The art field embracing gear grinding machinery is typified substantially by two types of machine, the designs of which differ according to the adopted grinding technique.

In a first type of machine, used to implement the NILES method, the work is offered to a bevelled disk type grinding wheel (two conical surfaces disposed coaxially and symmetrically back to back), whereas in the second type, the tooth or thread profile is generated (REISHAUER method).

Machines falling into the first mentioned category are especially suitable for grinding spur or helical teeth on cylindrical gears, and relatively simple in embodiment.

Machines of the second type referred to are designed to generate helicoid tooth flanks such as those, for example, of a worm, and make use of a grinding wheel exhibiting a threaded profile which meshes with the work during the grinding operation, such that both the wheel and the work describe movements typical of gear cutting (e.g. as in six-axis machines), with the tooth flank being generated as an envelope of straight lines rolling on the base circle.

A threaded grinding wheel of the type used for the REISHAUER process is usually dressed without the wheel being removed from its support in the grinding machine; this ensures speed and accuracy, and avoids any error that would occur were it to be shuttled back and forth continually between the grinder and a separate dresser.

A threaded grinding wheel is dressed in exactly the same way as a screw thread would be cut, using mechanical and electronic equipment of the highest quality and accuracy. Clearly enough, accuracy demands that the movement of the grinding wheel be faultlessly synchronized with that of the dressing tool; currently, this is achieved by adopting either all-mechanical linkages or fluid power controls, which are characterized by ultra-high precision. Accordingly, where drive ratios have to be varied to suit different construction parameters of the work, such as module, number of teeth etc., it becomes necessary to make use of change gears, or at least, to adopt suitable speed control means that permit of effecting the requisite modifications quickly (thus reducing machine down time) in order to adapt the profile of the grinding wheel to the specifications of the work.

The object of the invention is one of freeing a grinding machine from the necessity for mechanical or fluid power control systems as mentioned above, in such a way that, on the one hand, the grinding operation can be rendered more versatile and the variation of drive ratios that accompany a change of work made swifter and more flexible, and on the other, the operation of dressing the grinding tool can be made considerably more accurate (it will be noted that more accurate dressing has a favourable effect on the quality of the ultimate finish); in short, the dressing operation is made more flexible and speeded up by virtue of the fact that it does not rely on change manoeuvres, but rather, on the entry of new data into the unit by which the entire machine is controlled.

Such an object is not achieved, however, simply by using motors in conjunction with a conventional numerical control circuit, since there are numerous problems connected with such an expedient.

To govern the movement of the various machine axes, the control circuits of the type in question incorporate encoders associated with the shafts of the relative motors. Pulses generated by the encoder are read by the circuit, which calculates the exact position of the axes and then transmits the appropriate feed or rotate instruction to the work or the grinding wheel drive, or in the case of dressing, to the grinding wheel or dressing tool drives.

In the particular case of dressing operations, where accuracy is of paramount importance, and the flank of the thread to be dressed is angled, the grinding wheel must be rotated and the dressing tool traversed along its axis exactly together; at the same time, the tool must be fed into the wheel by a further drive.

Rotation of the wheel and axial traverse of the dressing tool are coordinated by feed steps which are determined by the type of transduction elements utilized, hence by the number of pulses generated: the greater the number of pulses, the smaller the steps, hence better approximation and a finer degree of accuracy (clearly, the number of pulses will be associated with a clock pulse of set duration 't', generated by the NC).

The problem of accuracy derives from the fact that a given input monitoring frequency exists above which the control circuit becomes unable to read the signals correctly, and also, from the fact that the angular velocity of the grinding wheel is markedly different during grinding and dressing operations. The pulse frequency is in fact given by multiplying together the number of pulses emitted per revolution of the motor with which the encoder is associated, and the running speed of the motor. Accordingly, if the number of pulses generated and the speed of the motor are too high and the facility of monitoring the input is lost, precision of the finish can well be unacceptably low for grinding purposes (or it may well happen that an alarm threshold is triggered in the Numerical Control and operation is inhibited altogether). By the same token, it is preferable to operate at the highest pulse frequency obtainable in order to ensure maximum precision (in any event, a frequency invariably higher than the NC is capable of monitoring).

SUMMARY OF THE INVENTION

The above problem can be overcome by adoption of the apparatus disclosed, in which the grinding wheel and dressing tool posts are driven by respective motors, both interlocked to a monitoring and control circuit, one of which is connected directly to the grinding wheel shaft and associated with two pulse generators that operate at dissimilar frequencies and can be selected according to the operation in hand, i.e. grinding or dressing, in such a way that the frequency of the pulsed output will be no higher than that which the monitoring and control circuit is able to read.

BRIEF DESCRIPTION OF THE DRAWINGS

The invention will now be described in detail by way of example, with the aid of the accompanying drawings in which FIG. 1 is a schematic representation of the essential parts of apparatus according to the invention;

FIG. 2 is a graph showing the respective linear and angular movements accomplished by the dressing tool and grinding wheel.

DESCRIPTION OF THE PREFERRED EMBODIMENTS

Referring to FIG. 1, apparatus according to the invention is incorporated into grinding machinery of the type utilizing a threaded grinding wheel 6 that is dressed in-situ, i.e. without being removed from its support at the grinding station.

The part of the apparatus directly concerned with the dressing operation comprises a grinding wheel post 1, and a tool post 2 (rigidly associated with and carried by the grinding wheel post 1), mounted on and capable of movement in relation to a base, denoted 10; the grinding machine proper, denoted 20, would be of a type, for example, with eight axes (two of which for forming gear teeth). According to the invention, the posts 1 and 2 are provided with respective motors 3 and 4 wired up independently to a numerically controlled monitoring and control circuit 5. The first such motor 3 is connected with the shaft of the grinding wheel 6 by way of a drive belt 33, and produces rotary motion, whilst the second motor 4 traverses a saddle 22, associated with the tool post 2, to produce linear motion of the dressing tool in the direction of the arrow denoted 23.

26 denotes a cross slide mounted to the saddle 22 and capable of movement in a direction 25 normal to the grinding wheel axis 9; the slide is driven by a relative motor 27 and dictates the depth to which the dressing tool enters the work, i.e. the grinding wheel.

It is an essential feature of the invention that the grinding wheel motor 3 associates with two separate pulse generators, or encoders 7 and 8, keyed to the shaft 9 of the grinding wheel. These encoders 7 and 8 are wired into the control circuit 5, as also are the encoders 11 and 28 fitted to the remaining two motors 4 and 27, respectively.

The number of pulses generated by the encoders 7 and 8 per unit of time is inversely proportionate to the angular velocity of the grinding wheel 6, as the frequency of the generated pulses, i.e. the product of multiplying the speed of the grinding wheel 6 by the number of pulses emitted per revolution of the shaft, must not exceed the maximum frequency that the control circuit 5 is capable of monitoring for control purposes.

12 denotes a switch (mechanical or electronic) wired between the encoders 7 and 8 and the control circuit 5, which permits of selecting either one or other of the two encoders 7 or 8 according to the operation in hand—viz, grinding or dressing.

With an apparatus structured in this way, work can be ground in a standard type grinding operation with the wheel 6 running at a typical grinding speed (say 1800 rev/min), switching-in one of the encoders 7 or 8 set to generate a given number of pulses (5000 per revolution) which, when multiplied by the angular velocity of the wheel 6, will give a pulse frequency within the range that can effectively be monitored by the control circuit 5.

When dressing the grinding wheel 6, the wheel will be distanced from the work (not illustrated) and its speed dropped (say, to 100 rev/min), whereupon upon the other encoder 8 or 7 will be switched in, this time being set to give a number of pulses per revolution higher than before (say, 90,000), though calculated similarly to produce a comparable pulse frequency which remains within the maximum that can be read by the control circuit 5. The changeover can be effected by using a magnetic or electromagnetic coupling to switch from one encoder to the other, or installing a software switching facility and rigidly associating both of the encoders with the arbor or shaft, or at all events, in such a way as to remain correctly timed with the grinding wheel shaft.

Thus, with the grinding wheel 6 turning at low speed during dressing, the encoder 7 or 8 activated will generate an ultra-high number of pulses which, when relayed to the control circuit 5, provides an almost instantaneous signal reflecting the angular displacement of the grinding wheel 6 (denoted 'h' in FIG. 2).

In like manner, the movement of the tool post 2 parallel with the grinding wheel axis 9 along the direction of the arrow 23 (denoted 'b' in FIG. 2), and the relative distancing of wheel 6 and tool 13, will follow a closely stepped curve as illustrated in FIG. 2.

The object achieved by the present invention is precisely that of reducing the movements of the axes h and b in such a way as to obtain a substantially linear curve.

As far as regards feed of the tool post saddle and slide in the directions arrowed 23 and 25, use will be made of encoders 11 and 28 affording ultraprecise resolution (0.0001 mm) and high frequency, since the dressing tool 13 runs at one speed only, and is used exclusively for the dressing operation. On the other hand, the grinding wheel motor 3 is associated, of necessity, with two encoders 7 and 8 generating dissimilar pulse frequencies, selectable and correctly timed, so as to obtain infinitesimally stepped movements 'h' and 'b' without straying from within the monitoring capabilities of the control circuit 5, and thus avoid unnecessary complication of the circuit itself.

The fact of approximating as closely as possible to a linear curve is instrumental in gaining greater accuracy, as mentioned beforehand.

In a preferred embodiment, the grinding wheel drive motor 3 and the dressing tool motors 4 and 27 will be of the d.c. or a.c. types conventionally used to position and control machine axes, as these ensure the requisite precision and speed.

What is claimed:

1. Apparatus for in-situ dressing of a threaded grinding wheel in gear grinding machines, comprising:
   a grinding wheel post,
   an electronic monitoring and control circuit,
   a first motor electrically connected to said electronic monitoring and control circuit, said first motor arranged and constructed to rotate said grinding wheel post,
   a dressing tool,
   a second motor electrically connected independently of the first motor to said monitoring and control circuit, said second motor arranged and constructed to drive said dressing tool side to side in a direction parallel to said grinding wheel axis,
   a third motor arranged and constructed to drive said dressing tool fore and aft in a direction perpendicular with respect to the grinding wheel axis, a first grinding wheel pulse generator and a second grinding wheel pulse generator associated with a rotary shaft of the grinding wheel, said first grinding wheel pulse generator arranged and constructed to closely match grinding wheel speeds in the range of 1,800 r.p.m. to 13,000 r.p.m., said second grinding wheel pulse generator arranged and constructed to closely match dressing wheel speeds in the range of 40 r.p.m. to 100 r.p.m., said first and second pulse generators generating a number of pulses the value of which is inversely proportionate to the angular velocity of the grinding wheel, said pulses having an output pulse frequency, defined as the number of pulses per revolution of the grinding wheel shaft multiplied by the angular velocity of the grinding wheel, closely matching the monitoring capability of the electronic monitoring and control circuit, a first dressing tool pulse generator associated with fore and aft movement of said dressing tool, and a second dressing tool pulse generator associated with side-to-side movement of said dressing tool, said first and said second dressing tool pulse generators having a resolution on the order of 0.0001 mm, wherein signals eminating from said dressing tool pulse generators are processed by said monitoring and control circuit to coordinate fore and aft, and side-to-side, movement of said dressing tool with the angular displacement of the grinding wheel, to increase the accuracy of the grinding and dressing operations.

2. Apparatus as in claim 1, wherein at least the motor producing rotation of the grinding wheel is selected from d.c. and a.c. types as conventionally used to control machine tool axes.

3. Apparatus as in claim 1, wherein the pulse generators associated with the grinding wheel are connected to the shaft of the wheel by way of a switched magnetic coupling in order to maintain correct timing with the shaft.

4. Apparatus as in claim 1, wherein the pulse generators associated with the grinding wheel are connected to the grinding wheel shaft rigidly, and switched electronically by the monitoring and control circuit.

5. Apparatus as in claim 1, wherein the pulse generators associated with the grinding wheel are connected to the shaft of the wheel by way of a switched electromagnetic coupling in order to maintain correct timing with the shaft.

* * * * *